W. F. WALLACE.
KITCHEN CABINET.
APPLICATION FILED SEPT. 14, 1915.
1,240,519.
Patented Sept. 18, 1917.
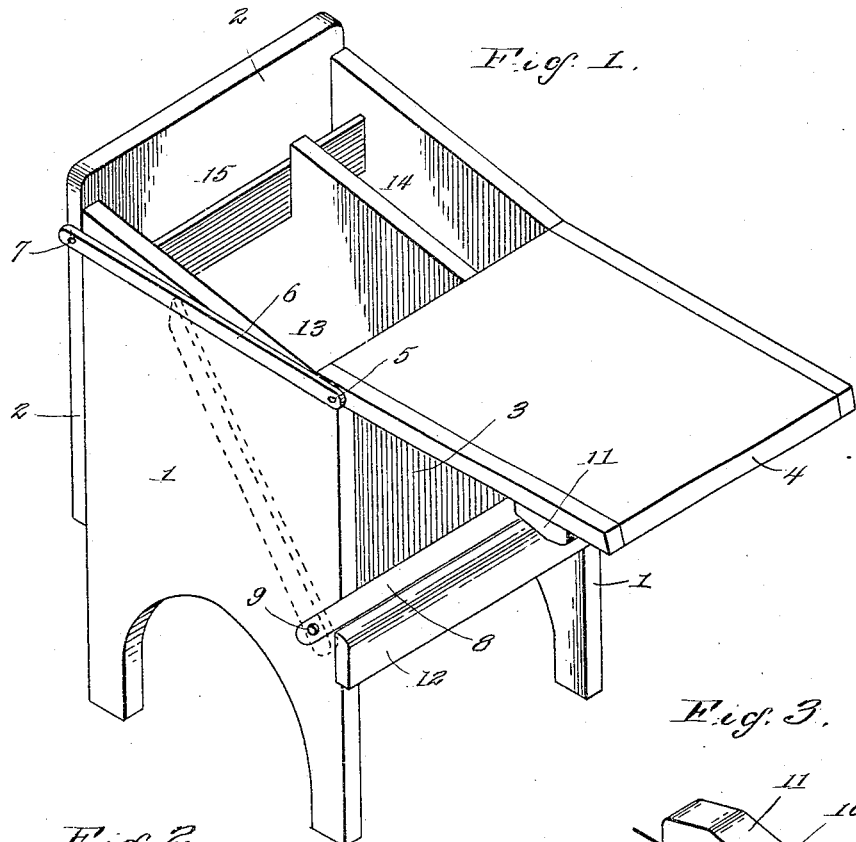
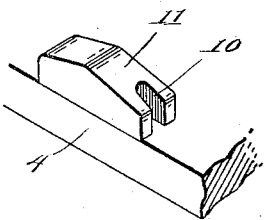
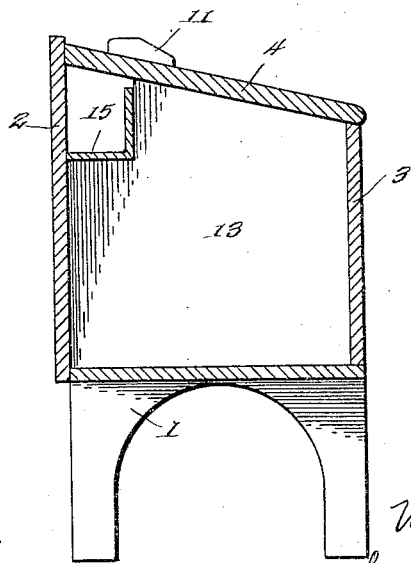
WITNESSES
Wm E. Valk Jr.
Wade Koontz
INVENTOR
William F. Wallace.
by Richard B. Cleman
his Attorney

UNITED STATES PATENT OFFICE.

WILLIAM FRANKLIN WALLACE, OF SCOOBA, MISSISSIPPI.

KITCHEN-CABINET.

1,240,519.  Specification of Letters Patent.  Patented Sept. 18, 1917.

Application filed September 14, 1915. Serial No. 50,706.

*To all whom it may concern:*

Be it known that I, WILLIAM F. WALLACE, a citizen of the United States, residing at Scooba, in the county of Kemper and State of Mississippi, have invented new and useful Improvements in Kitchen-Cabinets, of which the following is a specification.

This invention relates to the class of kitchen cabinets and more particularly to a combined dough board, meal and flour chest.

An object of my invention is to provide a cabinet of novel and peculiar construction, wherein flour, meal, and other pastry necessities may be placed, the top of which when opened is adapted to be used as a dough board.

Another object of my invention is to provide a plurality of compartments within the chest for the reception of pastry ingredients, all of which ingredients are within easy reach when desired.

A further object of my invention is to provide in one and the same article of manufacture, a cabinet and a pastry dough board, which board when in use is suitably supported by the said cabinet, and which when not in use may be conveniently inverted or swung upon its pivot to form a top or cover for the cabinet, as well as create an efficient means whereby the surface of the board upon which the dough is worked may be fully protected from dust and dirt which would otherwise naturally come in contact therewith were the same left exposed as is ordinarily the case.

A still further object of my invention is to provide a device of the character described, which is not only simple and durable in construction, but efficient in operation and one which can be manufactured and placed upon the market at a minimum cost.

With the above and other objects in view, my invention relates to such details of construction and in the arrangement and combination of the several parts as will be hereinafter more fully described and specifically pointed out in the appended claim.

In describing my invention in detail, reference will be had to the accompanying drawings wherein like characters denote like or corresponding parts throughout the several views, and in which:—

Figure 1 is a perspective view of the cabinet complete.

Fig. 2 is a vertical sectional view, and

Fig. 3 is fragmentary view.

Referring to the drawings, wherein is illustrated the preferred form of my invention, the numerals 1 designates the two supporting sides of the cabinet to which are secured in any suitable manner, the back 2 and front 3. A combined cabinet cover and dough board 4 is pivotally secured as at 5 so as to rest upon the top of cabinet and at the forward extremity thereof, through the medium of a pair of bars 6, one bar upon each side of the cabinet. The bars 6 are likewise pivoted as at 7 to the rear of the cabinet in such a manner as to permit free movement of the board 4, when desired.

The means employed for limiting the movement of the board 4 comprises a pair of arms 8, pivoted as at 9, one upon each side of the cabinet.

When the board is in operative position or the cabinet is opened as illustrated in Fig. 1 of the drawings, the said arms 8 are swung upon their pivots so as to allow the free ends thereof to engage a slot 10 provided within a pair of lugs 11 carried upon the said board, thus limiting the movement of the board in one direction and effectually and rigidly holding the same as desired.

A cross-bar 12 extends across the front of the cabinet and projects beyond the sides thereof for the purpose of not only limiting the movement of the arms 8 in a forward direction when supporting the dough board but also limiting the movement thereof in the opposite direction when the board 4 is closed as is clearly indicated by the dotted lines in Fig. 1.

The interior of the cabinet is divided into two main compartments, one of the compartments 13 forming a receptacle for the reception of flour, while the other compartment 14 is utilized for holding meal. At the rear interior of the cabinet and near the top thereof I provide a shelf or smaller compartment 15 upon which may be placed such pastry ingredients as salt, spice, sugar, etc.

It will be recognized that the top of the cabinet performs two distinct functions. When same is opened, a perfectly smooth surface is presented for the working thereon of pastry dough, and in which position the board is rigidly held by reason of the bars 6 and arms 8, whereas, the closing of the board will not only protect and cover the dough working surface thereof, but will also create a cover for the whole cabinet.

From the above, taken in connection with the accompanying drawings, it will be seen that a device or cabinet made in accordance with my invention is simple, practical, durable and efficient, and that the making of bread, cake, and other pastry is greatly facilitated by having all the necessary ingredients within easy reach of the maker.

It is thought from the foregoing that the advantages and novel features of my invention will be readily comprehended.

I desire it to be understood that I may make slight changes in the construction and in the arrangement of the several parts as will be hereinafter more fully described and specifically pointed out in the appended claim.

Having thus fully described my invention what I claim as new and desire to secure by Letters Patent is:—

In combination, a flour cabinet having an open top with the upper edges of opposed sides inclined, a combined dough board and cover for said open top of the cabinet, a pair of bars pivotally connected at adjacent ends to the rear side of the cabinet adjacent its top portion, the opposite ends of the bars being connected to the opposite edges of the board adjacent the end thereof remote from the point of connection of the bars with the cabinet, whereby the board may be swung around the pivotal point of said bars and disposed horizontally so that the normally bottom side of the board may be used as a kneading surface, and means for supporting the board in said position, said board being movable toward a vertical position in the rear of the cabinet by swinging the bars about their point of connection with the cabinet whereby the interior of the cabinet may be entirely exposed.

WILLIAM FRANKLIN WALLACE.

Witnesses:
D. P. STUART,
D. L. CARR.

Copies of this patent may be obtained for five cents each, by addressing the "Commissioner of Patents, Washington, D. C."